United States Patent
Roberge et al.

(10) Patent No.: US 9,585,304 B2
(45) Date of Patent: Mar. 7, 2017

(54) 3-WAY SEED FLOW SPLITTER FOR PLANTERS

(71) Applicant: CNH Industrial America LLC, New Holland, PA (US)

(72) Inventors: Martin J. Roberge, Saskatoon (CA); Travis L. Harnetiaux, Bourbonnais, IL (US); Chad M. Johnson, Arlington Heights, IL (US); Marvin A. Prickel, Homer Glen, IL (US); Frank C. Legner, III, Odell, IL (US)

(73) Assignee: CNH Industrial America LLC, New Holland, PA (US)

( * ) Notice: Subject to any disclaimer, the term of this patent is extended or adjusted under 35 U.S.C. 154(b) by 182 days.

(21) Appl. No.: 14/516,861

(22) Filed: Oct. 17, 2014

(65) Prior Publication Data

US 2016/0106026 A1  Apr. 21, 2016

(51) Int. Cl.
*A01C 7/08* (2006.01)
*B65G 53/52* (2006.01)

(52) U.S. Cl.
CPC ............ *A01C 7/082* (2013.01); *B65G 53/528* (2013.01)

(58) Field of Classification Search
USPC .................................................. 406/155, 156
See application file for complete search history.

(56) References Cited

U.S. PATENT DOCUMENTS

| | | |
|---|---|---|
| 3,431,027 A | 3/1969 | Kochey, Jr. |
| 3,606,103 A | 9/1971 | Taylor |
| 4,562,779 A | 1/1986 | Briggs |
| 5,133,270 A | 7/1992 | Ledermann et al. |
| 5,379,706 A | 1/1995 | Gage et al. |

(Continued)

FOREIGN PATENT DOCUMENTS

| | | | |
|---|---|---|---|
| CH | EP 1035048 A1 * | 9/2000 | ........... B65G 53/528 |
| DE | 44 07 010 A1 | 9/1995 | |

(Continued)

OTHER PUBLICATIONS

Flexiseeder Air Assisted Delivery and Distribution Module: An Overview Including Technical Specifications, Flexi Technical Note 003, Small G.T., et al. (13 pages).

*Primary Examiner* — Alicia Torres
(74) *Attorney, Agent, or Firm* — Rebecca L. Henkel; Rickard K. DeMille

(57) ABSTRACT

A row crop planter has a pneumatic system for conveying seeds to individual row units employing three-way splitters above certain master row units for supplying seed to each master row unit and a pair of associated slave row units. Each three-row splitter has an upper inlet chamber of annular shape with an offset inlet coupled to a conveying hose for receiving an air entrained seed flow, and an annular passageway extending downwardly from the inlet chamber to an outlet for delivering seeds to the master unit below. A pair of laterally extending slave outlet conduits extend obliquely upward and each has a jumper hose connecting with an adjacent slave unit. The flow circulating within the annular region allows seeds to fall downwardly and air to spiral upwardly into a supplemental air conduit. An air bypass passageway conveys air flow from the supplemental air conduit toward the slave outlet conduits.

10 Claims, 5 Drawing Sheets

(56) References Cited

U.S. PATENT DOCUMENTS

| | | | |
|---|---|---|---|
| 6,047,652 A | 4/2000 | Prairie et al. | |
| 6,273,648 B1 | 8/2001 | Poncelet et al. | |
| 6,494,154 B2 | 12/2002 | Kinzenbaw et al. | |
| 6,851,377 B2 | 2/2005 | Mayerle et al. | |
| 7,025,010 B2 | 4/2006 | Martin et al. | |
| 7,063,276 B2 | 6/2006 | Newton | |
| 7,093,547 B2 * | 8/2006 | Mayerle | A01C 7/081 111/174 |
| 7,827,929 B2 | 11/2010 | Garrison et al. | |
| 8,276,530 B2 | 10/2012 | Anderson et al. | |
| 2011/0311322 A1 * | 12/2011 | Jost | A01C 7/082 406/181 |
| 2012/0227647 A1 | 9/2012 | Gelinske et al. | |
| 2012/0298024 A1 | 11/2012 | Naylor | |
| 2013/0333601 A1 * | 12/2013 | Shivak | A01C 7/081 111/174 |

FOREIGN PATENT DOCUMENTS

| | | |
|---|---|---|
| DE | 10 2006 010 324 A1 | 9/2007 |
| WO | 2009/072858 A1 | 6/2009 |
| WO | 2013/105021 A1 | 7/2013 |

* cited by examiner

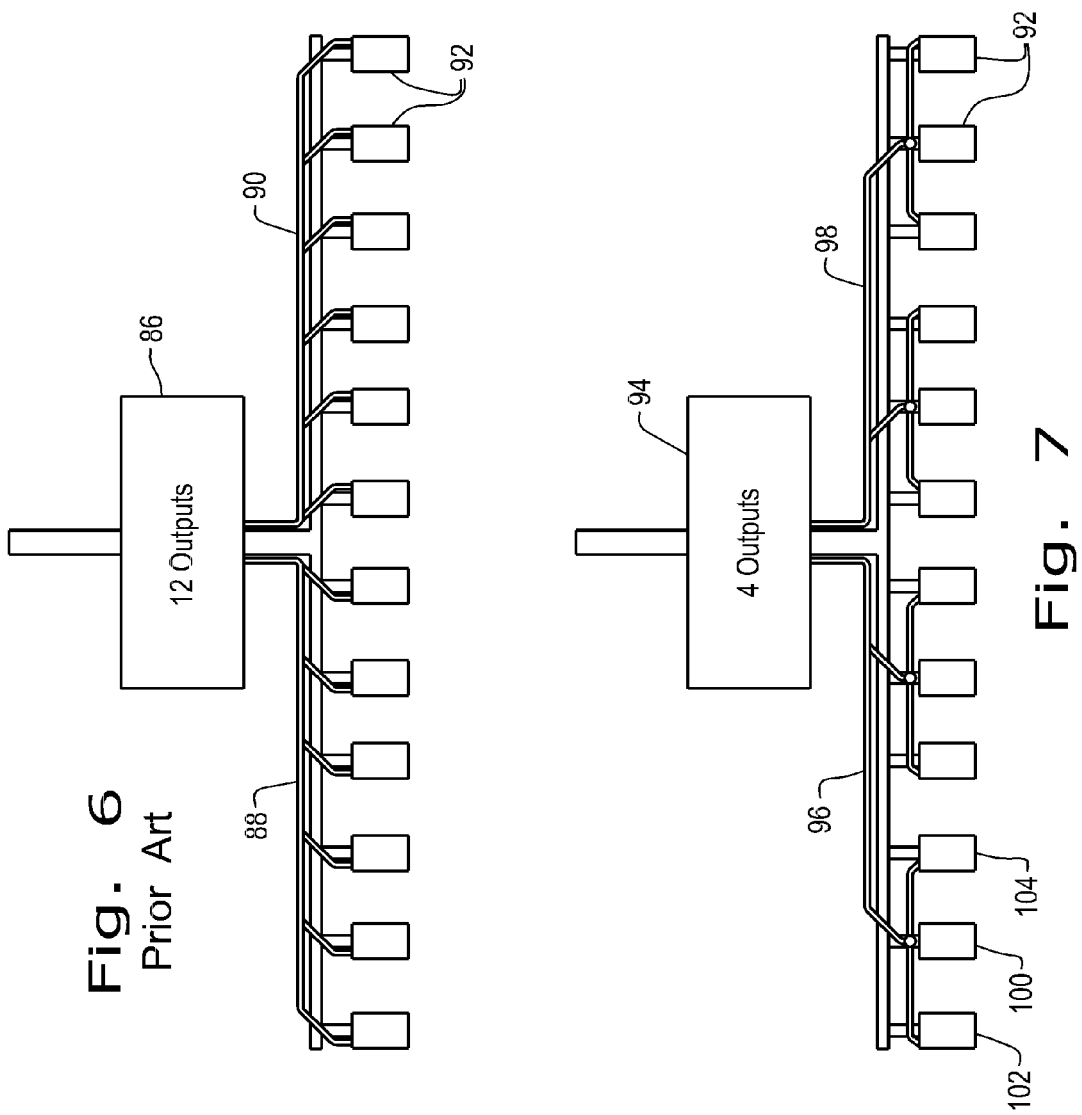

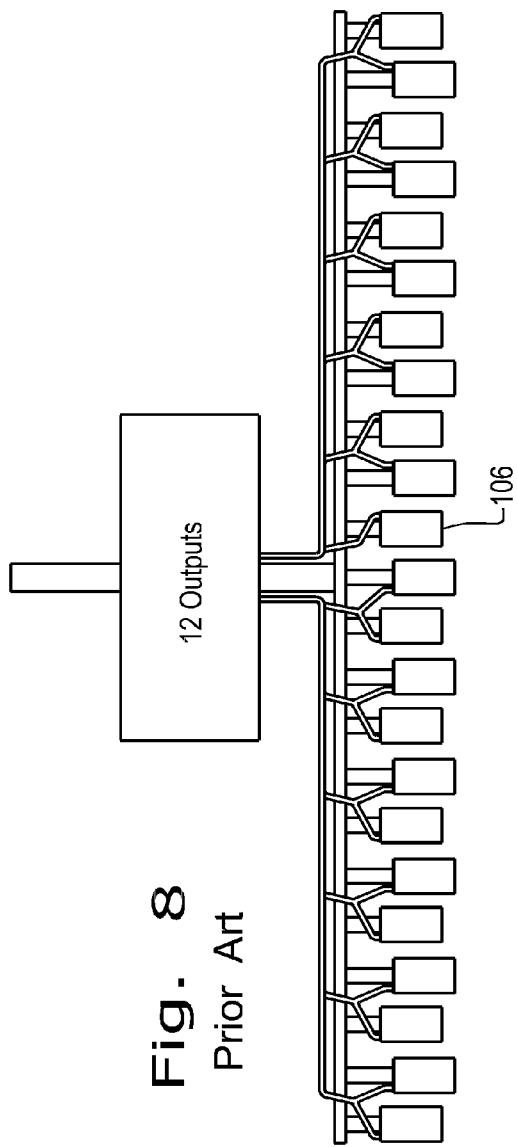
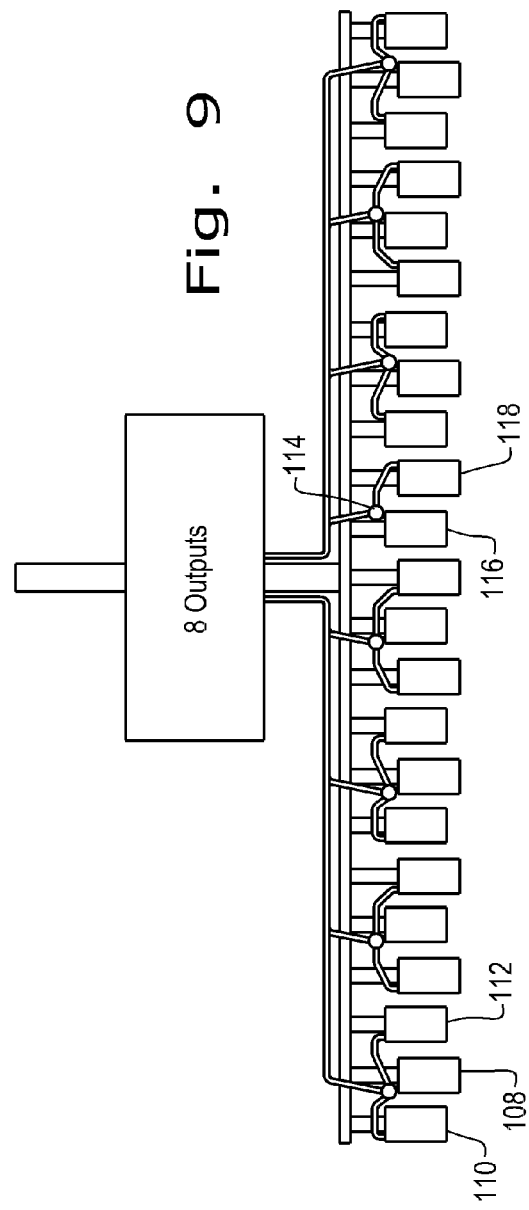

… (1)

3-WAY SEED FLOW SPLITTER FOR PLANTERS

BACKGROUND OF THE INVENTION

1. Field of the Invention

The present invention relates generally to agricultural equipment and, more particularly, to an apparatus to control the delivery of product, such as seed, from a main product storage container to multiple auxiliary storage containers.

2. Description of the Related Art

Modern agricultural planters are commonly equipped with one or more main seed hoppers that provide seed (or other granular product) in a forced air stream to multiple auxiliary seed hoppers. Each auxiliary seed hopper may be associated with one or more seed dispensing row units. Generally, the seed is entrained in an air/seed mixture that is delivered from the main seed hopper to the auxiliary seed hoppers In a conventional arrangement, multiple hoses will be run from the main seed hopper to the individual auxiliary seed hoppers. The length of the hoses connecting the auxiliary seed hoppers to the main hopper varies. This can create an unbalanced air distribution between hose runs of different lengths. More particularly, the shortest hose may get a disproportionate amount of air compared to the longest hose (commonly called preferential flow). This drawback is exacerbated as the number of rows of seed units increases for larger seeding machines.

One proposed solution has been to use a single hose to provide an air/seed mixture to more than one auxiliary seed hopper using a splitter or flow divider. Examples of such configurations are described in U.S. Pat. Nos. 7,025,010 and 8,276,530. These flow dividers are two-way splitters resulting in a reduction by about one-half of the number of hoses, however, in these arrangements, it is difficult to control fluidization and seed bridging/plugging can occur. The number of hoses on larger machines remains excessive.

Two-way splitters suffer from a number of further drawbacks. It is difficult to control the height of seeds in the master row (the row unit on which the splitter is mounted). It is difficult to control seed-on-seed impact at the intersection of master and slave hoses. It is difficult to reduce air velocity through the splitter outlet when only one slave row is supplied with seed often causing the hose to the slave row to be overfilled with seed. Keeping slave hoses clean remains a problem.

What is needed in the art is a technique for reducing the number of required hoses while improving seed delivery.

SUMMARY OF THE INVENTION

The present invention provides a seed distribution system for a planter having three-way splitters directly feeding a master unit and a pair of adjacent slave units.

The invention in one form is directed to a flow splitter for supplying seeds to individual row units of a row crop planter which includes an upper inlet chamber for receiving product flow, a passageway extending downwardly from the inlet chamber, and a pair of laterally extending outlet conduits and each having a hose for delivering product from the splitter to row units. There is an internal baffle extending downwardly beneath the laterally extending outlet conduits and each outlet conduit extends obliquely upward from the downward flow of product whereby product flow is diverted around the baffle by an obtuse angle from the initial downward direction obliquely upward to each of the outlet conduits. The upper inlet chamber may be a generally annular region having an offset inlet coupled to a conveying hose for receiving an air entrained product flow so that the flow circulates within the annular region allowing product to fall downwardly and air to spiral upwardly. There may be a plurality of flow splitters arranged in a hierarchical configuration, certain ones of which are adapted to receive product from other ones of the flow splitters.

The invention in another form is directed to a row crop planter which has at least one seed hopper and a plurality of laterally spaced apart row units. There is a pneumatic seed distribution system for delivering seeds from the hopper to the row units with certain ones of the row units each comprising a master row unit. Each master unit has an associated pair of slave row units and each has a three-way splitter supported above the row unit for supplying seed directly to the master unit below and to the associated pair of slave units.

In a still further form, the invention is directed to an agricultural implement for distributing an agricultural product has at least one centralized source of product and a plurality of spaced apart product dispensing locations. There is a pneumatic system for transporting product from the source to the dispensing locations including a number of product conveying hoses extending from the source to certain ones of the dispensing locations, the certain ones of dispensing locations each including a three-way flow splitter for supplying product to the certain dispensing location and to two additional dispensing locations.

An advantage of the present invention is a reduction in the overall number of supply hoses.

Another advantage is that seeds are sent more frequently to three row units, which provides a more continuous flow of seed through the hoses, therefore reducing the tendency for hoses to plug with stagnant seed required.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 6 is a schematic representation of the prior art product delivery system for a twelve row planter;

FIG. 7 is a schematic representation of a product delivery system for a twelve row planter according to the present invention;

FIG. 8 is a schematic representation of a prior art product delivery system for a split row configuration 12/23 planter employing two-way splitters;

FIG. 9 is a schematic representation of a product delivery system for a split row configuration 12/23 planter employing three-way splitters according to the present invention.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
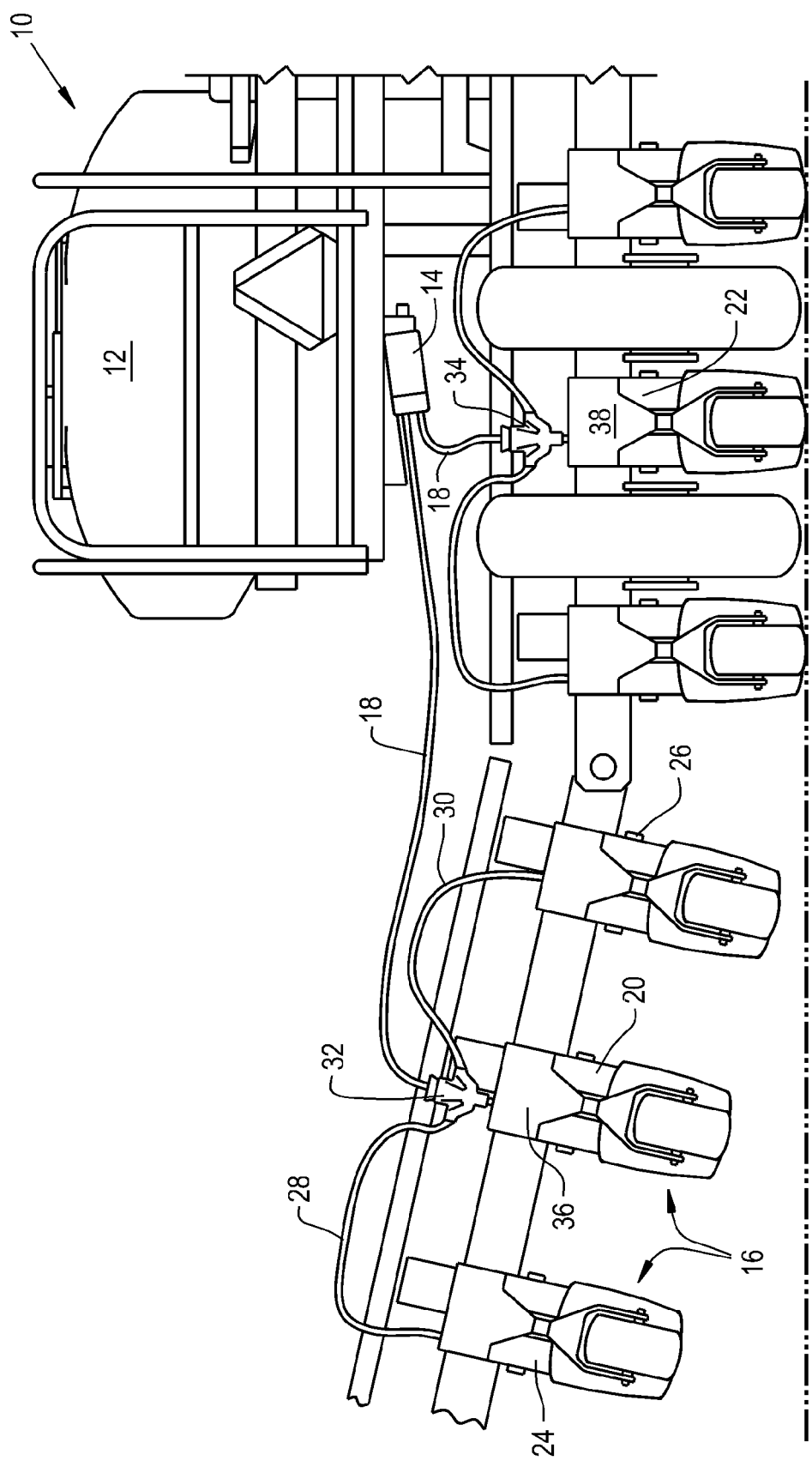
FIG. 1 is a partial rear elevation view of a planter incorporating the invention in one form.

Referring now to the drawings, and more particularly to FIG. 1, there is shown a rear view of the left half of an agricultural implement 10 such as a row crop planter, for distributing an agricultural product, e.g., seed, having at least one centralized source of that product such as the bulk fill hopper 12. A seed inductor 14 supplies product from the hopper to a plurality of spaced apart product dispensing locations such as row units 16. There is a pneumatic system for transporting product from the source 12 to the dispensing locations 16 including a number of product conveying supply hoses 18 extending from the source to certain ones of the dispensing locations. These certain dispensing locations 20 and 22 are termed master row units and each is disposed intermediate a further pair of dispensing locations 24 and 26 termed slave row units. The adjacent slave row units such as 24 and 26 receive product from their master row unit 20 by way of jumper hoses 28 and 30. In FIG. 1, the supply hoses 18 connect with three way splitters 32 and 34 located directly above the corresponding row unit seed boxes 36 and 38.

FIG. 1 depicts one half of a 12 row planter having 12 row units, 4 master row units and 8 slave row units. Such an implement would typically have a second hopper and two additional supply hoses for the other side. In this case, the number of dispensing units divided by three is four which is the number of supply hoses. One, two or three additional row units would require one further supply hose and, in the case of two or three further row units, an additional two or three way splitter. An illustrative 3-way splitter is shown in FIGS. 2 and 3.

Figure 2:
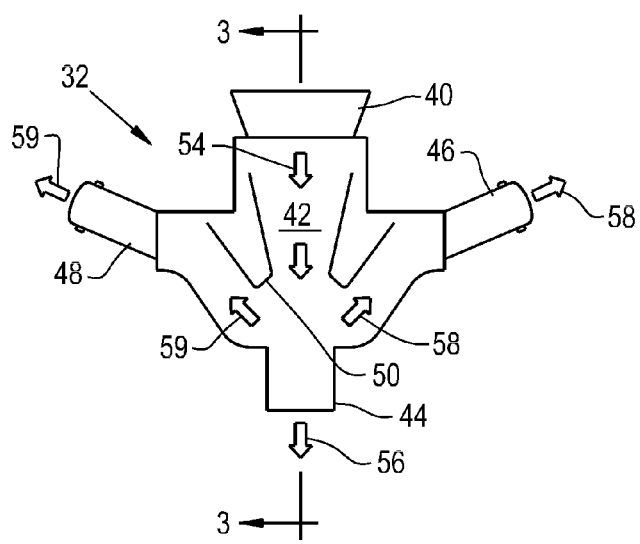
FIG. 2 is a cross-sectional view of a three-way splitter suitable for use in FIG. 1
Figure 3:
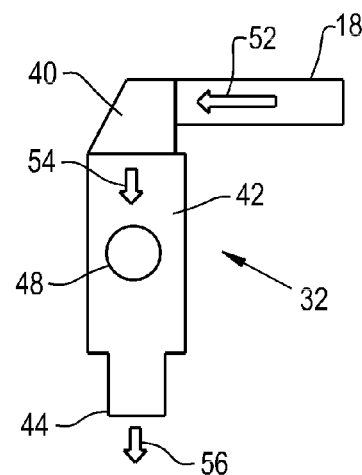
FIG. 3 is a cross-sectional view along lines 3-3 of FIG. 2.

In FIG. 2, splitter 32 has an upper inlet chamber 40 for receiving product from the supply hose 18 and an annular passageway 42 extending downwardly to the downward directed outlet 44 from which product passes into the master unit 32 directly below. There is a pair of laterally extending outlet conduits 46 and 48 each of which has a jumper hose 28 and 30 connecting with an adjacent slave unit 24 or 26 for delivering product to the adjacent unit. There is also an internal baffle 50 extending downwardly along the passageway walls and terminating beneath the laterally extending slave outlets. This baffle functions to direct product flow downward toward the master row unit and to divert product flow back obliquely upward to the slave units.

In operation, the air/product mixture from the supply hose or distribution line 18 is illustrated by the arrow 52 entering the inlet chamber 40 from which the air/product mixture flow is directed downwardly through the annular passageway 42 as shown by arrow 54. Initially, the air/product flows freely downward into the master unit seed box 36 as shown by arrow 56. As the filling operation progresses and seed box 36 fills, more and more of the flow is diverted around the bottom of baffle 50 to the seed boxes of the slave units as 24 and 26 shown by arrows 58 and 59.

Figure 4:
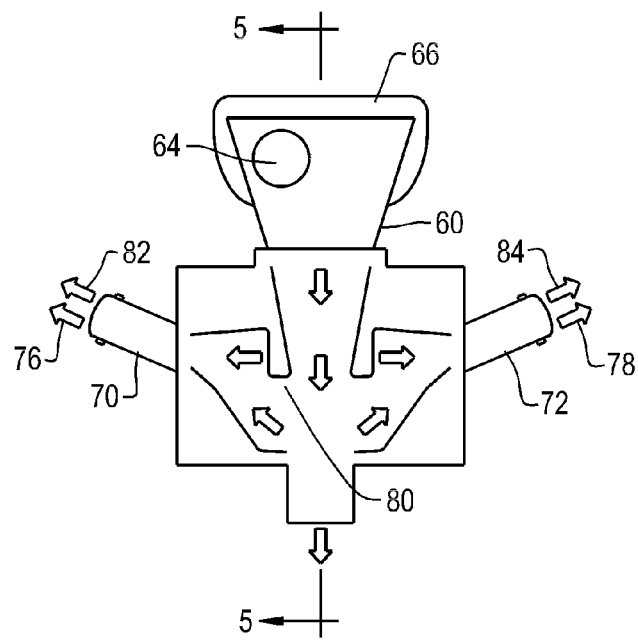
FIG. 4 is a cross-sectional view of another three-way splitter.
Figure 5:
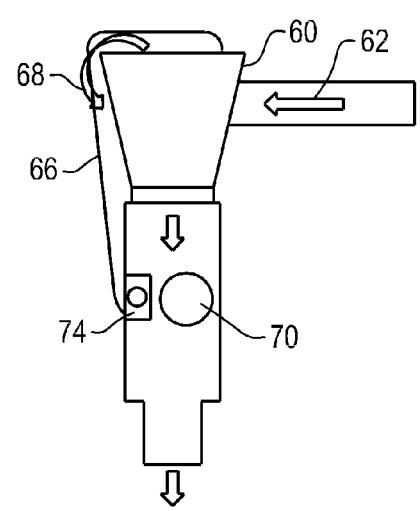
FIG. 5 is a cross-sectional view along lines 5-5 of FIG. 4.

FIGS. 4 and 5 show a variation on the splitter thus far discussed which includes an air bypass system which helps keep the slave or jumper hoses such as 28 and 30 clean. Here the upper inlet chamber 60 receives the air entrained seed flow 62 from a hopper (also sometimes referred to as "bulk fill seed tank") through an offset opening 64. The offset creates a cyclone effect and the flow circulates or swirls within the chamber allowing product to fall downwardly into the master unit below, and air to spiral upwardly and into a supplemental air conduit 66 as illustrated by arrow 68. This conduit functions as an air bypass passageway conveying the upwardly directed air flow toward the outlet conduits 70 and 72. The supplemental air flow is divided into two generally horizontal components in chamber 74 from which it passes as shown by arrows 76 and 78 into the outlet conduits 70 and 72. As a filling operation continues, more and more product is diverted around the bottom of the baffle 80 and obliquely upward as shown by arrows 82 and 84 as earlier discussed. The additional air flow 76 and 78 merges with the product flow 82 and 84 and proceeds to the slave row units.

Either variation on the three-way splitter may instead be advantageously operated as a two-way splitter by simply blocking the downwardly directed master row outlet so that there is no gravity-fed master row. Such non-preferential two-way splitters might be arranged in a hierarchical configuration with one splitter mounted on the toolbar of the machine and feeding two or more rows via the "slave" ports. In essence, there would be a primary seed inductor under the main seed tank that feeds two or more secondary inductors on the planter toolbar, which in turn each feed two or more row units.

The 12-row planter discussed thus far is shown schematically in FIG. 7 while that same planter with a single supply hose for each row unit is shown in FIG. 6. Note that the prior art arrangement of FIG. 6 has twelve outputs from the seed metering assembly 86 with six hoses 88 extending to one side of the planter and six more hoses 90 extending to the other side of the planter with each hose feeding an individual row unit 92. In contradistinction, the system of FIG. 7 employs only four outputs from the seed metering assembly 94 with two hoses 96 and 98 extending to each side. Each individual hose feeds one master row unit such as 100 and two adjacent slave row units 102 and 104.

A similar comparison of a two-way splitter of known design and the three-way splitter of the present invention is shown in FIGS. 8 and 9. In FIG. 8 twelve hoses supply product to 23 row units. The odd number of row units necessitates one hose being dedicated to a single row unit 106. The remaining row units are each supplied by a two-way splitter. However, in FIG. 9, eight hoses supply the twenty three row units. Here the number of row units divided by three is seven and two-thirds, not an integer. The number of product conveying hoses required is the smallest integer greater than (or equal to) this, namely, eight. Seven hoses feed three-way splitters associated with a master unit such as 108 and two adjacent slave units such as 110 and 112. A two-way splitter 114 is employed to supply the remaining two row units 116 and 118.

Figure 10:
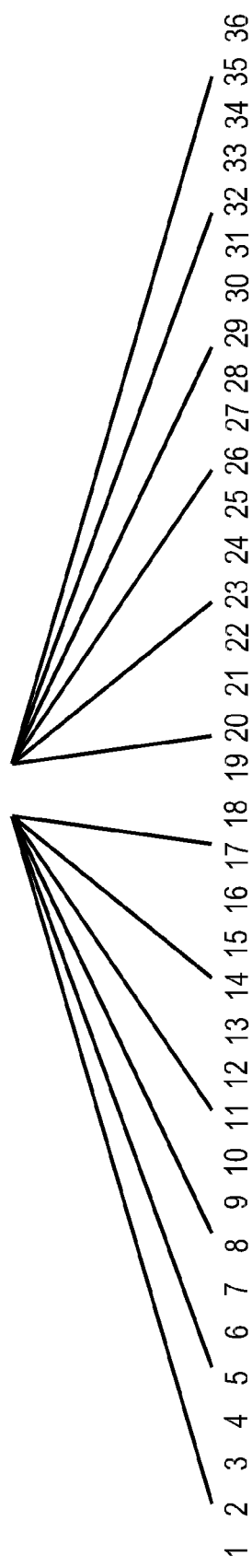
FIG. 10 is a simplified schematic representation of a product delivery system for a thirty-six row planter according to the present invention.

FIG. 10 is a simplified illustration of the number of product supply hoses required for a thirty-six row planter. Thirty-six divided by three yields twelve, the number of required supply hoses. Had there been thirty eight row units, an additional hose to a two-way splitter or two additional dedicated hoses to individual row units would have been required. Application of these concepts to any number of row units should now be clear.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural implement for distributing an agricultural product including:
   at least one centralized source of product and a plurality of spaced apart product dispensing units,
   a pneumatic system for transporting product from the source to the dispensing units including a number of product conveying hoses extending from the source to certain ones of the dispensing units, each of the certain ones of the dispensing units including
      a three-way flow splitter for supplying product to the certain dispensing unit and to two additional dispensing units, the three-way flow splitter comprising an upper inlet chamber comprising a cyclone chamber,
      a passageway extending downwardly from the inlet chamber,
      a downward directed outlet for delivering product to the dispensing unit below, and
      a pair of laterally extending outlet conduits, each outlet conduit having a hose connecting with an adjacent additional dispensing unit for delivering product from the splitter to each adjacent additional dispensing unit,
   wherein the cyclone chamber swirls the incoming air entrained product allowing product to fall gently into the dispensing unit below while directing a portion of the air flow upwardly and away from the inlet chamber.

2. The agricultural implement of claim 1, wherein the number of product conveying hoses is the smallest integer at least as great as the number of dispensing locations divided by three.

3. The agricultural implement of claim 2, wherein each three-way flow splitter is located directly above the corresponding certain dispensing unit.

4. The agricultural implement of claim 1, wherein each of the laterally extending outlet conduits extends obliquely upward.

5. The agricultural implement of claim 1, wherein each three-way splitter further includes an internal baffle extending downwardly for directing product flow toward the dispensing unit, the baffle terminating beneath the laterally extending outlet conduits whereby product flow is directed back obliquely upwardly to each outlet conduit.

6. The agricultural implement of claim 4, wherein each three-way splitter further includes a supplemental air conduit for merging a supplemental flow of air with each obliquely upwardly directed product flow to each adjacent additional dispensing unit.

7. An agricultural implement for distributing an agricultural product including:
   at least one centralized source of product and a plurality of spaced apart product dispensing units,
   a pneumatic system for transporting product from the source to the dispensing units including a number of product conveying hoses extending from the source to certain ones of the dispensing units, the certain ones of dispensing units each including
      a three-way flow splitter for supplying product to the certain dispensing unit comprising a master unit and to two additional dispensing units comprising a pair of slave units, the three-way flow splitter comprising an upper inlet chamber,
      a passageway extending downwardly from the inlet chamber,
      a downward directed outlet comprising a master unit outlet for delivering product to the master unit below, and
      a pair of laterally extending outlet conduits comprising slave outlets, each having a hose connecting with an adjacent slave unit for delivering product from the splitter to each of the adjacent slave units,
   wherein each slave outlet extends obliquely upward.

8. The agricultural implement of claim 7, wherein each three-way splitter further includes an internal baffle extending downwardly for directing product flow toward the master unit outlet, the baffle terminating beneath the laterally extending slave outlets whereby product flow is directed back obliquely upwardly to the slave outlets.

9. The agricultural implement of claim 8, wherein each three-way splitter further includes a supplemental air conduit for merging a supplemental flow of air with each obliquely upwardly directed product flow to a slave unit.

10. The agricultural implement of claim 9, wherein the upper inlet chamber comprises a generally annular region having an offset inlet coupled to a product conveying hose for receiving an air entrained product flow, the flow circulating within the annular region allowing product to fall downwardly and air to spiral upwardly and into the supplemental air conduit.

* * * * *